United States Patent
Patel et al.

(10) Patent No.: US 7,044,378 B2
(45) Date of Patent: May 16, 2006

(54) SYSTEM AND METHOD FOR IMAGING AND DECODING OPTICAL CODES USING AT LEAST TWO DIFFERENT IMAGING SETTINGS

(75) Inventors: Mehul Patel, Fort Salonga, NY (US); Kefei Lu, Dix Hills, NY (US); David P. Goren, Smithtown, NY (US); Edward Hatton, Peterborough (CA); Bruno Vande Vyvre, Westhampton, NY (US); Eugene Joseph, Coram, NY (US); Bradley S. Carlson, Northport, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/633,216

(22) Filed: Aug. 1, 2003

(65) Prior Publication Data

US 2004/0118928 A1   Jun. 24, 2004

Related U.S. Application Data

(60) Provisional application No. 60/434,519, filed on Dec. 18, 2002.

(51) Int. Cl.
*G06K 7/10* (2006.01)

(52) U.S. Cl. ............ 235/454; 235/462.15; 235/462.17; 235/462.24

(58) Field of Classification Search ............... 235/454, 235/462.14, 462.15, 462.17, 462.22, 462.23, 235/462.24, 462.32; 250/566, 205
See application file for complete search history.

(56) References Cited

U.S. PATENT DOCUMENTS

| | | | | |
|---|---|---|---|---|
| 5,479,011 | A * | 12/1995 | Rudeen et al. | 250/235 |
| 5,559,555 | A * | 9/1996 | Shimizu et al. | 348/364 |
| 5,602,379 | A * | 2/1997 | Uchimura et al. | 235/462.11 |
| 5,635,697 | A | 6/1997 | Shellhammer et al. | 235/462 |
| 5,811,828 | A * | 9/1998 | Laser | 250/566 |
| 5,929,418 | A | 7/1999 | Ehrhart et al. | 235/462 |
| 5,969,321 | A * | 10/1999 | Danielson et al. | 235/462.01 |
| 6,179,208 | B1 * | 1/2001 | Feng | 235/472.01 |
| 6,223,988 | B1 * | 5/2001 | Batterman et al. | 235/472.01 |
| 6,249,008 | B1 * | 6/2001 | Bunte et al. | 250/566 |
| 6,637,658 | B1 | 10/2003 | Barber et al. | 235/462.35 |
| 6,918,539 | B1 * | 7/2005 | Nakajima et al. | 235/454 |

* cited by examiner

FOREIGN PATENT DOCUMENTS

EP   1354291 A2   10/2003

*Primary Examiner*—Steven S. Paik
(74) *Attorney, Agent, or Firm*—Carter, DeLuca, Farrell & Schmidt, LLP.

(57) ABSTRACT

A system and method for imaging an optical code is provided including the steps of consecutively imaging an optical code respectively using at least a first and a second imaging setting; generating at least first and second sets of image data respectively corresponding to the first and second imaging settings; evaluating at least one of the first and second sets of image data; and selecting at least one of the first and second sets of image data in accordance with the evaluation. The system includes an imaging engine having a lens assembly and a photo sensor array for consecutively imaging an optical code located in a field of view of the imaging engine using at least the first and the second imaging settings, and generating the at least first and second sets of image data respectively corresponding to the first and second imaging settings. The system further includes at least one processor for evaluating the at least one of the first and second sets of image data, and selecting the at least one of the first and second sets of image data in accordance with the evaluation.

31 Claims, 6 Drawing Sheets

SYSTEM AND METHOD FOR IMAGING AND DECODING OPTICAL CODES USING AT LEAST TWO DIFFERENT IMAGING SETTINGS

PRIORITY

This application claims priority to a United States Provisional Application filed on Dec. 18, 2002 and assigned U.S. Provisional Application Ser. No. 60/434,519, the contents of which are incorporated herein by reference.

BACKGROUND OF THE INVENTION

1. Field of the Invention

This invention relates to imaging and decoding of optical codes, and particularly to imaging and decoding an optical code using first and second imaging settings and decoding the optical code using image data corresponding to the first and second imaging settings.

2. Description of the Related Art

Optical codes are patterns made up of image areas having different light reflective or light emissive properties, which are typically assembled in accordance with a priori rules. The optical properties and patterns of optical codes are selected to distinguish them in appearance from the background environments in which they are used. A barcode is an optical code having a pattern of variable-width rectangular bars separated by fixed or variable width spaces. The bars and spaces have different light reflecting characteristics. One example of a one dimensional barcode is the UPC/EAN code used to identify, for example, product inventory. An example of a two-dimensional or stacked barcode is the PDF417 barcode. A description of PDF417 barcode and techniques for decoding it are disclosed in U.S. Pat. No. 5,635,697 to Shellhammer et al., and assigned to Symbol Technologies, Inc., which is incorporated herein by reference in its entirety. Another conventional optical code is known as "MaxiCode". It consists of a central finder pattern or bull's eye center and a grid of hexagons surrounding the central finder. Another type of optical code is a code formed of one or more symbols, where the individual symbols are identified by optical character recognition (OCR). Optical codes can be used as a rapid, generalized means of data entry, for example, by reading a target barcode from a printed listing of many barcodes.

Devices for identifying or extracting data from optical codes are sometimes referred to as "optical code readers" of which barcode scanners are one type. Most conventional optical scanning systems are designed to read one-dimensional barcode symbols. Optical code readers are used in both fixed and portable installations in many diverse environments such as in stores for check-out services, in manufacturing locations for work flow and inventory control and in transport vehicles for tracking package handling. In some uses, the optical code reader is connected to a portable data processing device or a data collection and transmission device. Frequently, the optical code reader includes a handheld sensor which is manually directed at a target code.

Optical codes can also be read by employing optical code readers having an imaging engine. An imaging engine includes an image sensor having a two-dimensional array of cells or photo sensors, such as an area charge coupled device (CCD), a lens assembly for focusing light incident on the image sensor and associated circuitry coupled to the image sensor for processing electronic signals generated by the image sensor. Each photo sensor senses the incident light and generates an electrical signal, known as a pixel signal that corresponds to the sensed light. The array of photo sensors thus generates a two-dimensional array of pixel signals, known as pixel data or image data which corresponds to an image in a field of view of the engine.

The image data is provided to a processor that executes decoding software for decoding the image data and outputting a decoded code that corresponds to the image data. The quality of the image data for achieving accuracy during decoding for obtaining an accurate decoded code is dependent upon variables such as the degree of focusing, exposure, gain control and illumination achieved by the imaging engine, as well as other factors, such as environmental conditions including illumination, air purity, etc. Unsuccessful reads result when the quality of image data is lacking and the decoding software is unable to accurately decode the image data.

In applications where optical codes are read and decoded quickly, such as in rapid succession, if the time consumed for receiving the image data, processing the image data, decoding the image data and outputting the decoded code exceeds the time interval until a next set of image data is received, a possibility exists for one or more unsuccessful reads, such as misreads or no reads to occur.

In order to improve quality of the image data, conventional optical code readers having imaging engines may make a determination if the number of occurrences of unsuccessful reads exceeds a predetermined threshold, and if so, may determine the cause and take appropriate action. However, the code may have to be re-imaged after the determination and appropriate action have been performed, resulting in a repetitious and lengthy procedure.

Accordingly, it is an object of the present invention to provide a system and method for decreasing the time for imaging and decoding an optical code and preventing unsuccessful reads and no reads.

It is a further object of the present invention to provide a system and method for consecutively imaging each optical code twice using at least two different imaging settings for generating corresponding first and second sets of image data, and using the set of image data having a better decodability quality for decoding the optical code.

SUMMARY OF THE INVENTION

In accordance with the present invention, a method for imaging an optical code is provided. The method includes the steps of consecutively imaging an optical code using at least a first and a second imaging setting; generating at least first and second sets of image data respectively corresponding to the first and second imaging settings; evaluating at least one of the first and second sets of image data; and selecting at least one of the first and second sets of image data in accordance with the evaluation. Preferably, the imaging step images using the second imaging setting immediately after imaging using the first imaging setting. The evaluating step includes evaluating a decodability quality of at least one of the first and second sets of image data. The method further includes the step of decoding image data from the selected set of image data that corresponds to the optical code.

In accordance with another embodiment of the present invention, an optical code reader system for reading an optical code is provided. The system includes an imaging engine having a lens assembly and a photo sensor array for consecutively imaging an optical code located in a field of view of the imaging engine using at least a first and a second imaging setting, and means for generating at least first and second sets of image data respectively corresponding to the first and second imaging settings. The system further includes at least one processor for evaluating at least one of the first and second sets of image data, and selecting at least one of the first and second sets of image data in accordance with the evaluation. Computer code executable by the at least one processor for processing the first and/or second sets of image data, including evaluating and selecting in accordance with the evaluation, may be stored on a computer readable medium or transmitted via a propagated data signal embodied in a transmission medium.

In still another embodiment of the present invention, an optical code reading system is provided. The system includes an optical code reader having a lens assembly for focusing incident light, a photo sensor array for sensing the focused incident light and generating image data corresponding to two different imaging settings, and transmission means for transmitting the image data. The system also includes a processor externally located from said optical code reader for receiving the image data corresponding to the two different imaging settings and processing the image data.

BRIEF DESCRIPTION OF THE DRAWINGS

Various embodiments of the invention will be described herein below with reference to the figures wherein.

DETAILED DESCRIPTION OF THE PREFERRED EMBODIMENTS

A system and method for imaging an optical code is provided where an optical code reader consecutively images the optical code by performing first imaging using a first set of imaging configuration settings and generating a first set of image data, and performing a second imaging, immediately after the first imaging, using a second set of imaging configuration settings and generating a second set of image data. As the first and second sets of image data are generated, they are provided to a processor for processing thereof, where the first set of image data is received by the processor in a stream of data followed by receipt of the second set of image data in a stream of data.

The processor processes a portion of the first set of image data for locating data associated with the optical code and determining decodability quality thereof, and upon receipt of the second set of image data, processes a portion of the second set of image data for locating data associated with the optical code for determining decodability quality thereof.

The processed portions of the first and second sets of image data are preferably complementary portions. The processor may alternatively process the first and second sets of image data using serial processing, or may process the first and second sets of image data simultaneously using parallel, triple, etc. processing.

Upon locating the optical code in one of the first and second sets of image data, the location in which the optical code is located is used to locate the code in the other set of image data. The set of image data that is determined to have better decodability quality is processed for extracting data corresponding to the optical code, and the extracted data is decoded using a decoding algorithm. The decoded code may be further processed by a processor(s), such as for display thereof, retrieving information associated with the decoded code, such as a price value, and for updating information associated with the decoded code, such as an inventory database.

It should be noted that the aspects of the inventions disclosed in this patent application are applicable to optical code readers, in general, without regard to the particular type of optical codes which they are adapted to read. The invention described may also be applicable to other image recognition and analysis applications.

System Overview

Figure 1:
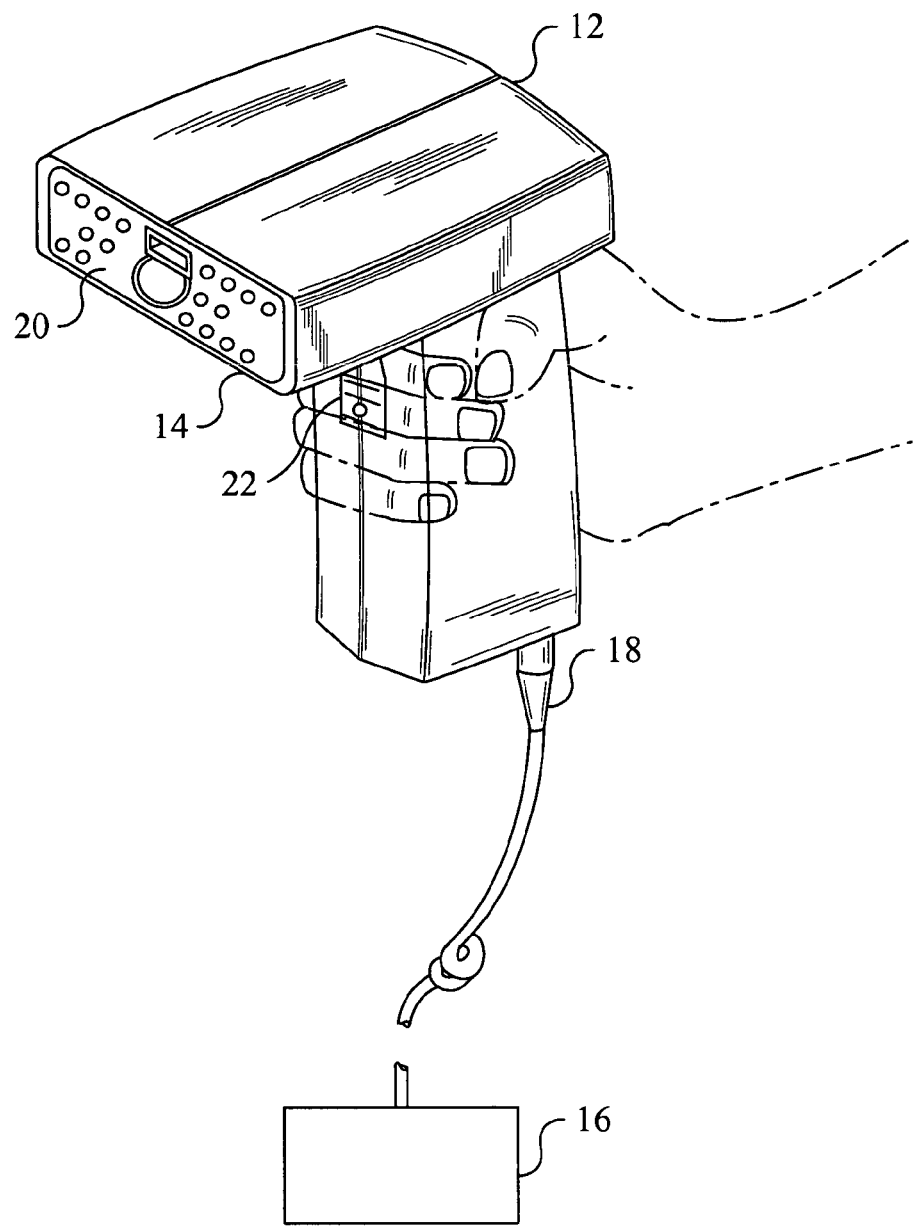
FIG. 1 is a perspective view of an optical code imaging system in accordance with the present invention.

FIG. 1 is a perspective view of an exemplary optical code imaging system 10 including an optical code reader 12 having an imaging engine 14 and a host terminal 16 connected to the reader 12 via cable 18. The imaging engine 14 is partially exposed at a forward face 20 of the reader for imaging objects within a field of view of the imaging engine 14. The reader 12 is provided with an actuation means for activating the imaging engine 14 to image the field of view of the imaging engine, where the actuation means preferably includes manual actuation means such as a trigger 22 and/or automatic actuation means, such as an automatic mechanical actuator (not shown) responsive to a mechanical stimulus, or an automatic actuator responsive to a sensed property or a processed signal.

The reader 12 may be a unit integrated into a stationary fixture, such as a checkout counter, a doorway molding, a toll booth, a station on a conveyor belt, etc., or a mobile unit, such as a handheld reader or a rotating turret. Furthermore, the reader 12 may be attached to or integrated with a portable, handheld computer device, such as a PDA and handheld computer devices available from Symbol Technologies, Inc., such as the PDT 6800 Series and the PDT 8100 Series Portable Data Terminals, or attached to or integrated with portable scanning systems or terminals, such as those available from Symbol Technologies, Inc. Such systems may be incorporated as part of a local area, cellular or wide area network to coordinate scanning and other image processing functions described below. Furthermore, the reader 12 may include video control circuitry and frame grabbing circuitry for outputting video signals for displaying images on a terminal monitor. The reader 12 may further include a data compression module (not shown) for compressing image data, such as for storage within the reader 12 and/or host terminal 16. In addition, the imaging engine 14 may be integrated into a video phone system for sharing use of display, processing and I/O capabilities.

In circumstances where the reader 12 is to be retrofitted from a laser line scan engine to an imaging engine 14, the imaging engine 14, and associated circuitry (not shown) can be inserted in place of the line scan engine and circuit board.

In this way, previously designed toolings, housings and host devices may be employed and provide continuity in upgrading the code reading system. In preferred embodiments, the imaging engine 14 is less than two cubic inches in volume and is dimensioned to replace a moving laser beam scanning engine in a handheld optical code scanner, such as a SE900 or SE1200 form factor scanning engine.

Cable 18 may provide data communication between the reader 12 and the host terminal 16 and/or electric communication for providing electrical power to the reader 12. For example, electrical power may be provided to the reader 12 via the host terminal 16 and cable 18, or alternatively by a rechargeable battery within the reader 12. The cable 18 may be partially or fully replaced by wireless communication means such as radio frequency, optical or cellular communication means. For example, the reader 12 may include a radio frequency board and an antenna which provide a mobile radio link to one or more data terminals, such as the host terminal 16. An infrared data interface (IRDA) or multi-contact shoe may also be provided to communicate data between the reader 12 and an external receiver or docking device, respectively. Compressed tag and/or image data may be transmitted to the host terminal 16 via a radio frequency link, IR communication link, or direct contact with the docking device.

Image data generated by the imaging engine 14 are processed by the reader (as described further below) and/or by the host terminal 16. The host terminal 16 includes or accesses at least one processor, where the at least one processor may be connected to one or more peripherals or computing devices, such as a video monitor, and/or a network. It is contemplated that the reader 12 may operate as a standalone device, without being connected to host terminal 16 or other processor.

The reader 12 is capable of being aimed at an optical code, where the optical code is brought into the field of view of the reader 12 by moving at least one of the optical code and/or the reader 12. Upon actuation, the imaging engine 14 images the optical code within its field of view and generates corresponding image data. A series of optical codes, such as a series of objects on an assembly line each having an affixed code, or a printout of a series of codes, may be provided to the reader 12 for sequential imaging of individual optical codes of the series of optical codes by the reader 12.

Figure 2A:
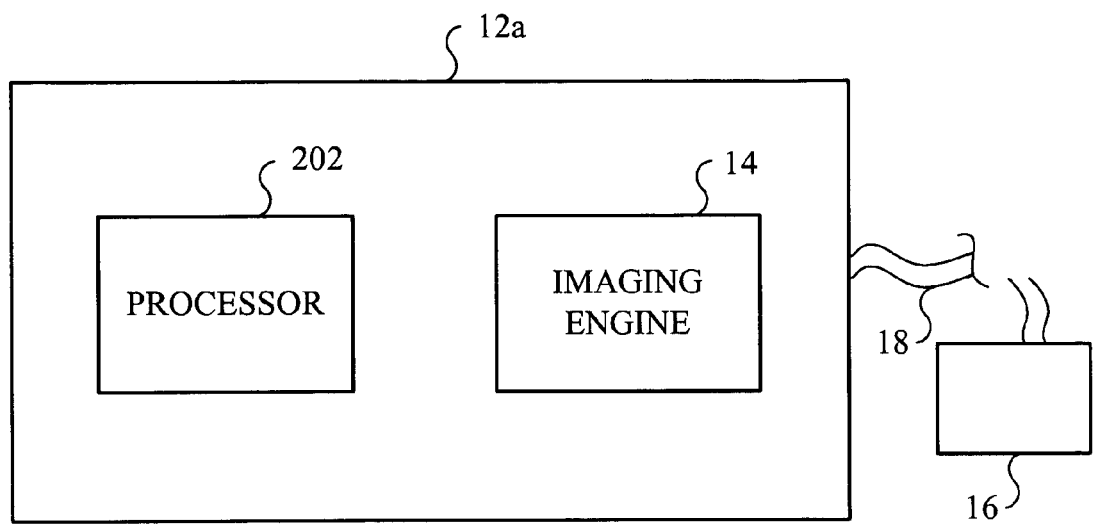
FIG. 2A is a block diagram of an optical code reader and a host terminal in accordance with the present invention.

FIG. 2A is a block diagram of a reader 12a in accordance with a first embodiment of the present invention. As shown, the reader 12a includes the imaging engine 14 and a processor 202. The imaging engine 14 is responsive to control signals generated by the processor 202, host terminal 16 and/or actuating means to image an optical code positioned in a field of view currently aimed at by the imaging engine 14 using at least a first and second set of configuration settings for generating respective first and second sets of image data. The first and second sets of image data are processed by at least one of the processor 202 and an external processor included in the host terminal 16 for analyzing and decoding the first and second sets of image data in combination to obtain a decoded code that corresponds to the optical code.

Figure 2B:
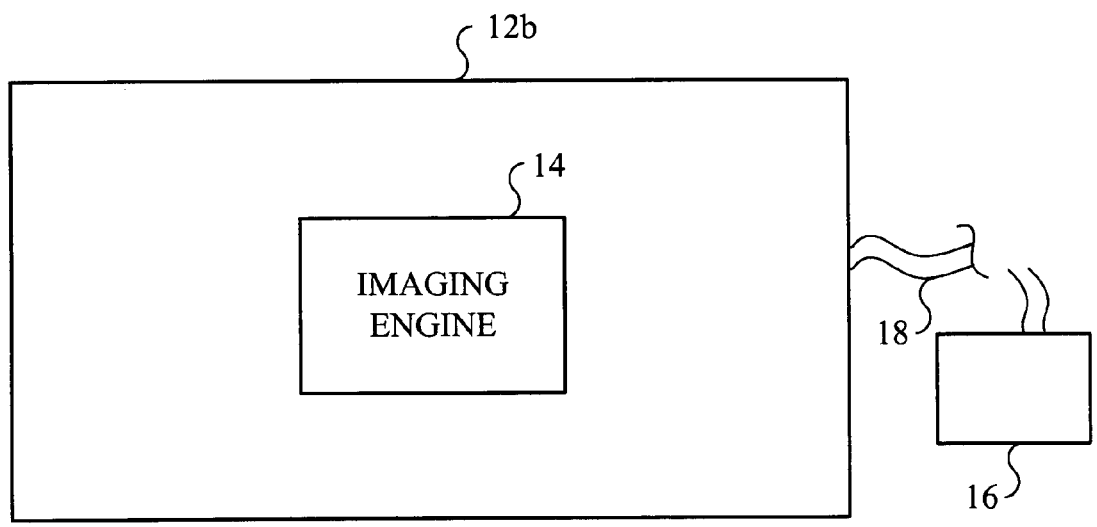
FIG. 2B is a block diagram of an optical code reader and a host terminal in accordance with another embodiment of the present invention

FIG. 2B is a sectional view of a reader 12b in accordance with a second embodiment of the present invention. The reader 12b includes the imaging engine 14 which is responsive to the host terminal 16 and/or actuating means to image an optical code positioned within a field of view currently aimed at by the imaging engine 14 using the first and second set of configuration settings for generating respective first and second sets of image data. The first and second sets of image data are transmitted via cable 18 and processed by the host terminal 16 for analyzing and decoding the first and second sets of image data in combination to obtain a decoded code that corresponds to the optical code. Reader 12b does not include a processor for processing the image data, and the image data is transmitted via cable 18 to one or more processors, such as an external processor in host terminal 16 for exclusive processing thereof.

Imaging Engine

Figure 3:
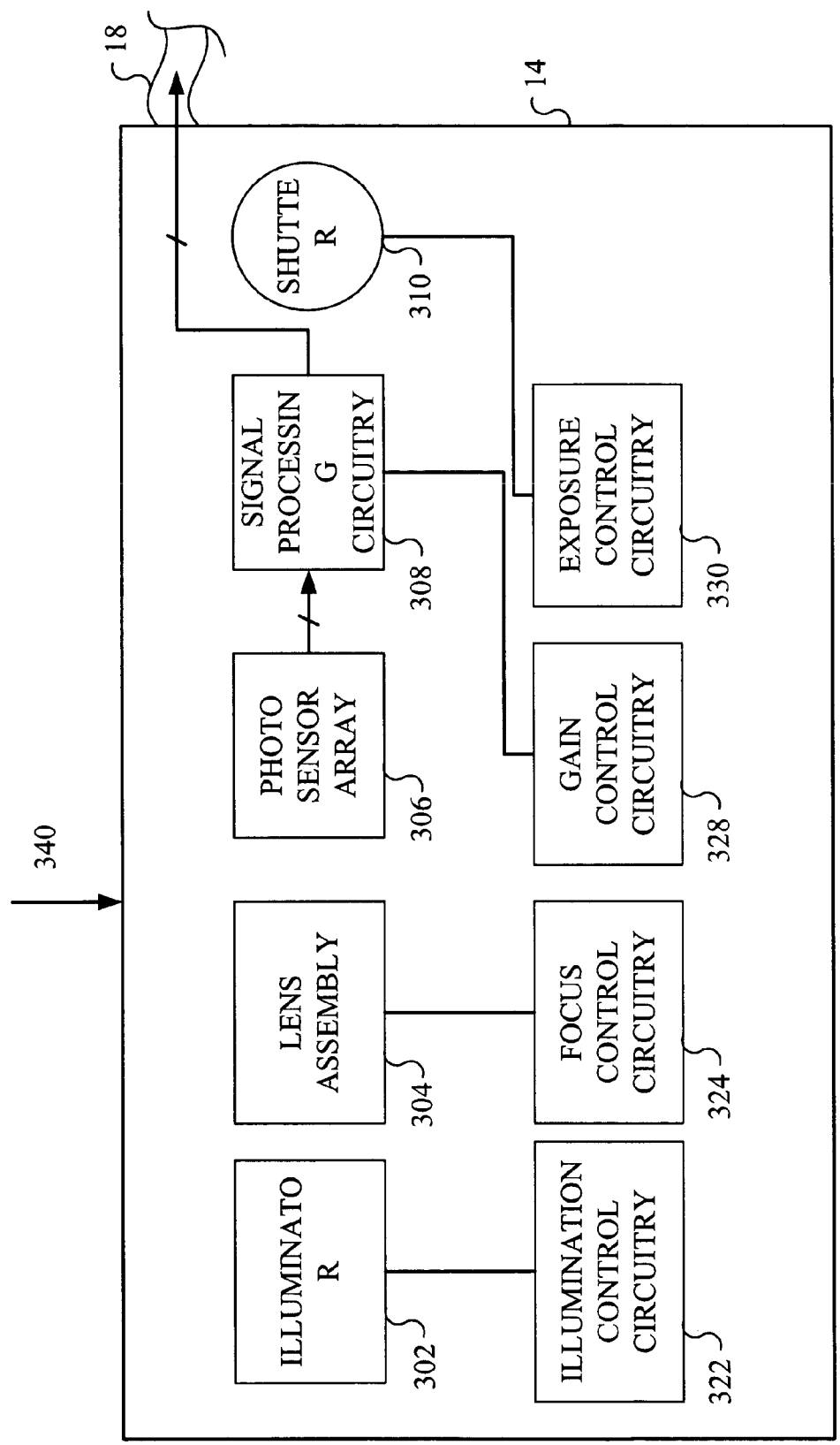
FIG. 3 is a block diagram of an imaging engine of the optical code reader illustrated by FIG. 2A or 2B.

With reference to FIG. 3, the imaging engine 14 is shown to include an illuminator 302 for providing illumination during imaging, a photo sensor array 306 for sensing light incident thereon and generating an array of pixel signals, i.e., image data, corresponding to the sensed light, a lens assembly 304 having one or more objective lenses for focusing light incident on the photo sensor array 306, signal processing circuitry 308 for processing the pixel signals generated by the photo sensor array, including gain processing, and preferably, an electronic or mechanical shutter 310 capable of opening and closing to control the degree of exposure of the photo sensor array 306 to incident light. The imaging engine 14 further preferably includes control blocks, having electrical circuitry and/or mechanical devices, responsive to control signals 340 including illumination control circuitry 322 for controlling the illumination component, focus control circuitry 324, for controlling the lens assembly 304, gain control circuitry 328, for controlling gain processing by the signal processing circuitry 308 and/or exposure control circuitry 330 for controlling the shutter 310. All or some of the components of the imaging engine 14 may be included within an integrated circuit board. Furthermore, the signal processing circuitry 308, the illuminator control circuitry 322, the focus control circuitry 324, the gain control circuitry 328 and/or the exposure control circuitry 330 may be located external to the imaging engine 14 and/or the reader 12.

The illuminator 302 illuminates the field of view of the reader 11 using one or more illumination sources, such as laser, LEDs, or conventional lighting, where the illuminator control circuitry 322 controls actuations and/or parameters, such as intensity and duration of the illumination provided by the illumination sources. The photo sensor array 306 includes a two-dimensional array of cells or photo sensors, such as an area charge coupled (CCD) photo detector, which correspond to image elements or pixels in a field of view of the device. Each sensor of the photo sensor array 306 receives a reflected beam via the lens assembly 304 and transmits an analog pixel signal to signal processing circuitry 308.

The position of one or more lenses of the lens assembly 304 are adjustable by the lens control circuitry 324 for controlling focusing of light on the photo sensor array 306. In a preferred embodiment, for each optical code being imaged, the lens control circuitry 324 controls the lens assembly 304 to assume a first position for a obtaining a first focal point for generating a first set of image data and then a second position for obtaining a second focal point for generating a second set of image data. Preferably, when imaging a bar code, the first focal point obtained is five inches and the second focal point obtained is nine inches.

The signal processing circuitry 308 preferably includes circuitry such as a buffer, an automatic gain control block, a gain and filter block and a digitizer (not shown) for buffering, amplifying, filtering, and digitizing the pixel signals generated by the photo sensor array 306 to produce a digital signal suitable for processing by a processor. The signal processing circuitry 308 may further include interface circuitry for transmitting digital signals and for interfacing the imaging engine 14 with the processor 202 and/or host terminal 16 for direct transmission of the image data to the processor 202 and/or host terminal 16 for processing thereof. In another embodiment, portions of the signal processing circuitry 308 are located external to the imaging engine 14 and/or the reader 12, and in one embodiment the entire signal processing circuitry is included in the host terminal 16.

Upon actuation of the imaging engine 14 to read an optical code, the imaging engine 14 is configured in accordance with a first set of configuration settings, where the configuration settings control, for example, the degree of illumination and/or actuation of the illuminator 302, time interval for exposure of the photo sensor array 306 to incident light, gain control of the signal processing circuitry 308 and/or positioning of the lens assembly 304 for determining the focus point used. The configuration settings may be predetermined fixed settings, or predetermined settings controlled by the illumination control circuitry 322, the focus control circuitry 324, the gain control circuitry 328, and/or the exposure control circuitry 330, or may be processed settings responsive to historical and/or currently sensed and/or user-entered information in accordance with control signals 340. The imaging engine 14 is actuated to image its field of view using the first set of configuration settings, generate a first set of corresponding image data and transmit the first set of generated image data in a first stream of data to the processor 202 and/or the host terminal 16.

After performing the first imaging, and preferably while the first stream of data is still being transmitted, the imaging engine 14 is automatically reconfigured with a different set of configuration settings different from the first set of configuration settings. The second set of configuration settings may be predetermined fixed settings, predetermined settings controlled by the illumination control circuitry 322, the focus control circuitry 324, the gain control circuitry 328, and/or the exposure control circuitry 330, or may be processed settings responsive to processing of the first stream of data by the processor 202 or the host terminal 16 in accordance with control signals 340. The imaging engine 14 is actuated to image its field of view using the second set of configuration settings, generate a second set of corresponding image data and transmit the second set of generated image data in a second stream of data to the processor 202 and/or the host terminal 16.

Since the second imaging is performed immediately following the first imaging, a time gap between the first and second imagings is in the order of milliseconds, the field of view being imaged for the first and second imagings is substantially the same. Furthermore, the environmental conditions and the positions of the optical reader and the optical code being read are substantially unchanged between the first and second imagings. The only main difference between the first and second imagings is that each imaging is performed using different image configuration settings. Accordingly, the pixels of the first set of image data have respective corresponding pixels in the second image of data. It is contemplated that the imaging engine may be used to image an optical code more than two times and accordingly generate more than two sets of image data corresponding to the image optical code.

Processing

Figure 4:
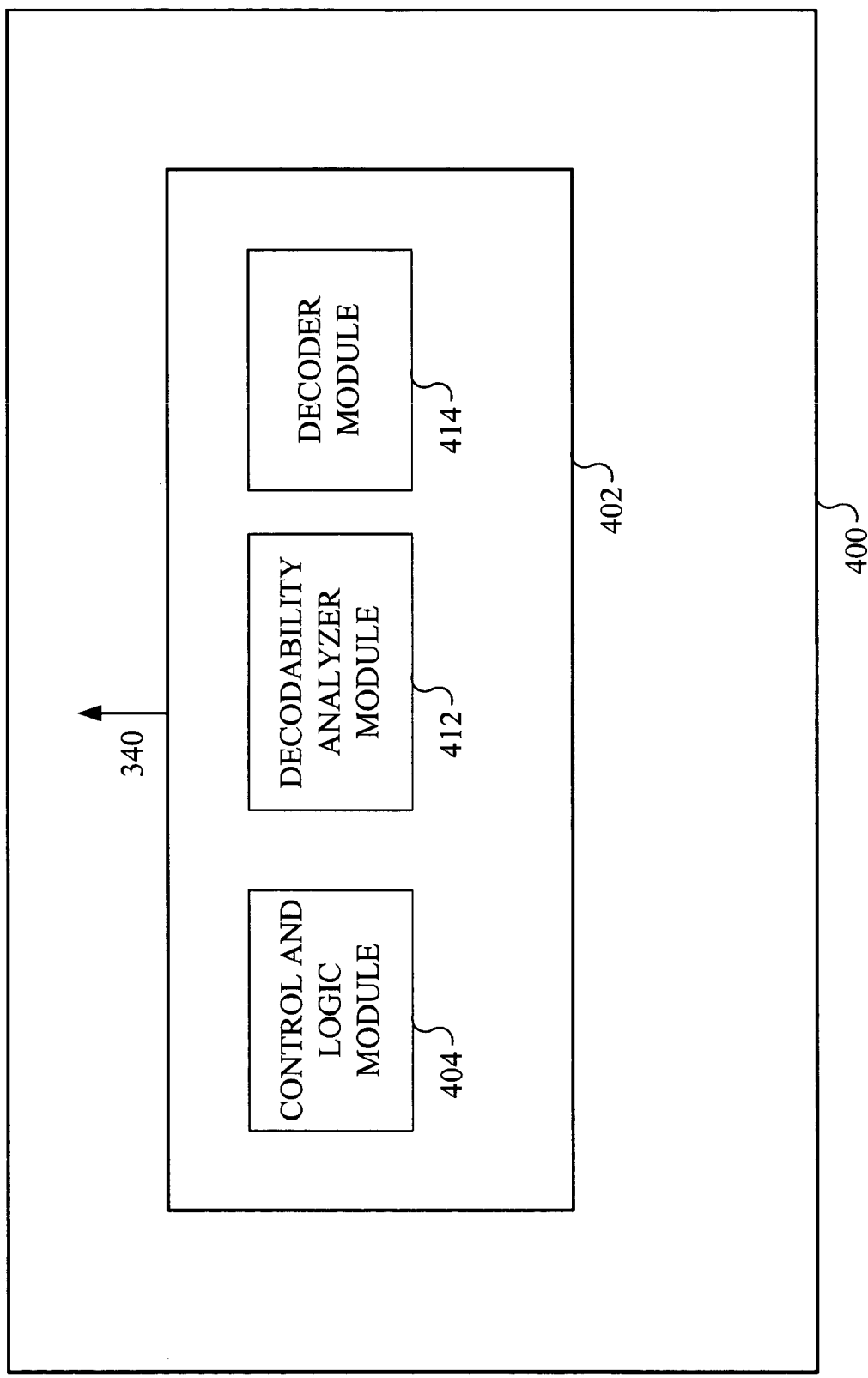
FIG. 4 is a block diagram of a processing module of the optical code imaging system illustrated by FIG. 1.

With reference to FIG. 4, processing module 400 includes processor assembly 402 having one or more processors, where processing module 400 is included in processor 202 and/or host terminal 16. Processor assembly 402 may include multiple processors for performing parallel, triple, etc. processing. Processor module 400 further includes a control and logic module 404, a decodability analyzer module 412 and a decoder module 414, each of which are each a software module including a set of programmable instructions capable of being executed by processor assembly 402. It is noted that the series of programmable instructions corresponding to one or more of the modules described herein for performing the various functions in accordance with the present invention can be stored on a computer-readable medium, such as a CD, smart card, 3.5" diskette, etc. or transmitted via propagated signals.

For each optical code being imaged and decoded, the processor assembly 402 receives at least first and second streams of image data, processes the first and second streams of image data, and outputs a decoded code. Furthermore, the processor assembly 402, after processing at least a portion of the first stream of image data, preferably, provides control signals 340 to the imaging engine 14 for configuring imaging settings to control the imaging engine 14, accordingly. The decoded code may be further processed by processor 202 or other processor(s), such as for display thereof, retrieving information associated with the decoded code, such as a price value, and/or updating information associated with the decoded code, such as an inventory database.

The control and logic module 404 and/or control circuitry (not shown) control operation, including controlling actuation and/or the imaging settings for the imaging engine 14, and data flow between the image engine 14 and the processor assembly 402. The control circuitry may include synchronization circuitry having a clock or crystal for synchronizing operation of the imaging engine 14, the processor assembly 402 and/or data flow between the imaging engine 14 and the processor.

The decodability analyzer module 412 receives the first stream of data and the second stream of data, where the second stream of data is typically received after receiving the first stream of data. It is contemplated that the imaging engine 14 includes circuitry for transmitting the second stream of data while the first stream of data is still transmitting so that the first and second streams of data are transmitted substantially simultaneously. It is further contemplated that the processor assembly 402 receives the first and second streams of data substantially simultaneously. The processor 202 may process data from both the first and second streams in parallel, triple, etc. for simultaneously processing thereof, or may process data from the first and second data streams in serial fashion by alternating between processing data from the first and second data streams.

Until the first and second streams of data are completely received by the decodability analyzer module 412, an incomplete set of data is received for the first and second streams of data. However, processing is begun immediately on the incomplete sets of data, thereby maximizing processing speed. As described earlier, the first and second sets of image data correspond substantially to the same field of view.

Figure 5:
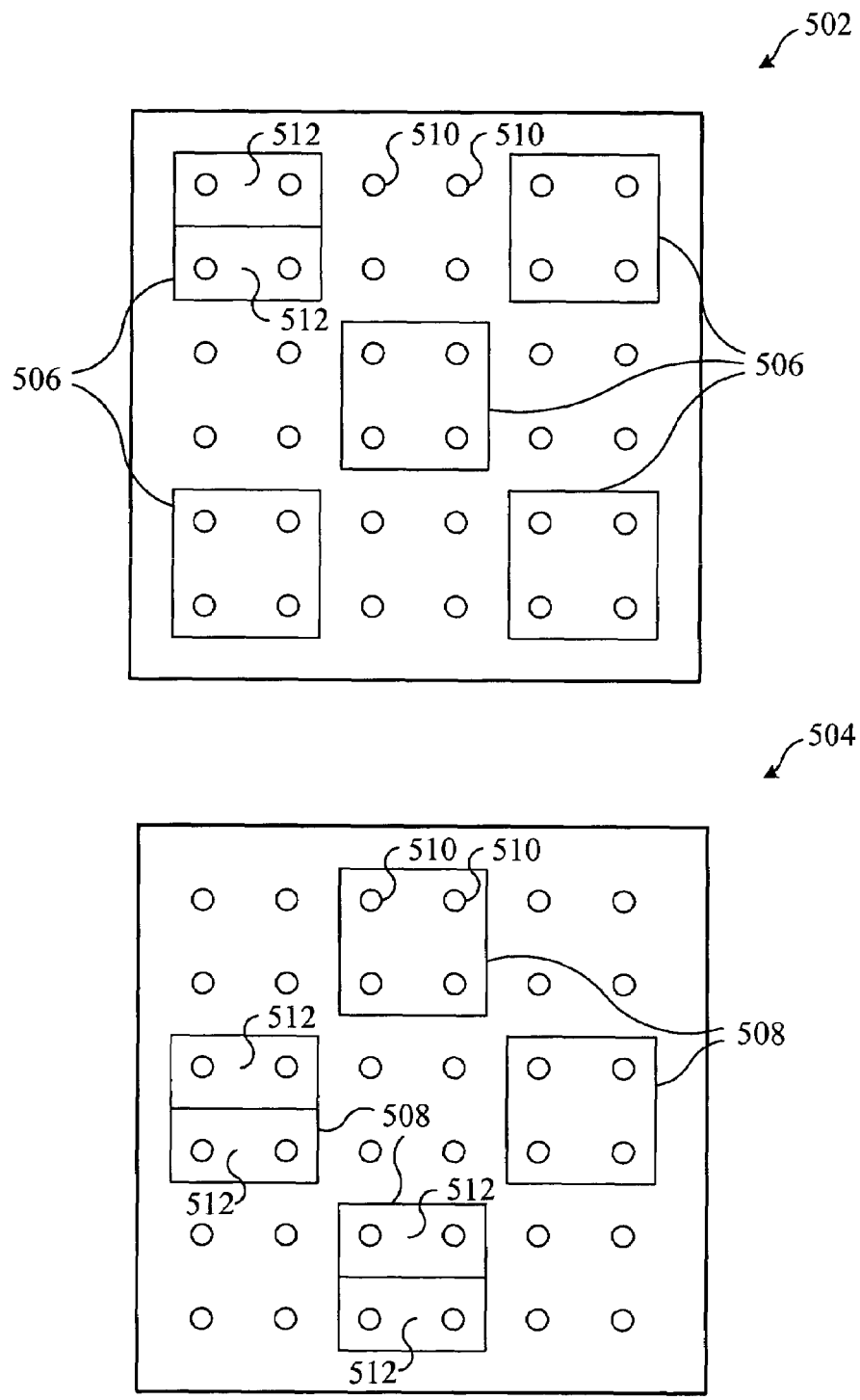
FIG. 5 is a schematic diagram of first and second sets of image data generated by the optical code imaging system illustrated by FIG. 1.

With respect to FIG. 5, duplication of processing is avoided while processing the first and second sets of image data, 502 and 504, by processing a first subset, or a first portion 506 of the first set of image data 502 and processing a second subset, or a second portion 508 of the second set of image data 504, where the first and second subsets substantially do not include pixel datum 510 that correspond to one another. With respect to the field of view, to which pixel datum 510 of the first and second sets of image data both correspond, the first and second portions 506, 508 are complementary, i.e., the first and second subsets are mutually exclusive. The first and second portions 506, 508 may each be formed of disjointed or noncontiguous sections 512.

Alternatively, the first and second portions 506, 508 may each be formed of joined or contiguous sections, or a combination of contiguous and noncontiguous sections, as shown in FIG. 5. It is contemplated that the image data may be formed of an array having one dimension or being multi-dimensional, such as two, three or four dimensional, with dimensions being in the x, y, z or time planes.

A computer data signal in accordance with the present invention, as described herein, is embodied in a transmission medium for execution by the processor 202 or other processor(s) for processing the imaged optical code. The data signal includes a code segment including instructions for receiving at least the first and second sets of image data corresponding to consecutive imaging of an optical code using respective image settings; a code segment including instructions for evaluating at least one of the first and second sets of image data; and a code segment including instructions for selecting at least one of the first and second sets of image data in accordance with the evaluation.

Figure 6:
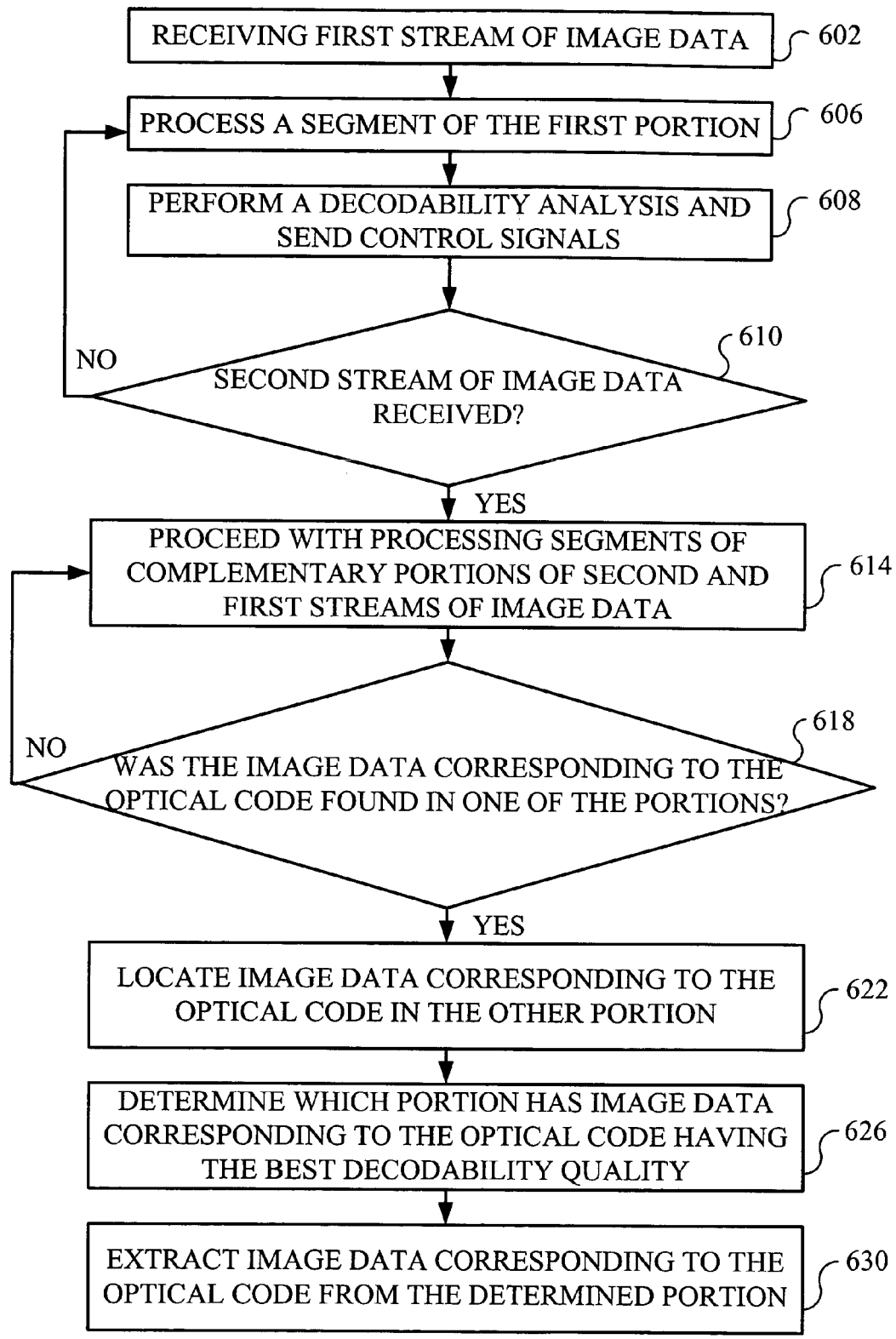
FIG. 6 illustrates a flowchart showing operation of an exemplary decodability analyzer module of the processing module illustrated in FIG. 4.

With reference to FIG. 6, a flowchart is provided showing procedural steps performed by an exemplary decodability analyzer module 412. At step 602, the decodability analyzer module 412 receives the first stream of image data. At step 606, a segment 512 of the first portion 506 of the first stream of image data is processed for determining if data corresponding to the optical code resides in the increment.

In a preferred embodiment, step 608 is included where a decodability analysis of the data received from the first stream of data is performed by the decodability analyzer module 412. Step 608 is preferably executed when a predetermined amount of data of the first stream of data has been received. The results of the decodability analysis are used to generate control signals 340 for adjusting the imaging settings for imaging the code the second time. Control signals 340 include at least one of an illumination control signal, a gain control signal, a lens adjustment control signal, and an exposure control signal. Generation and transmission of the control signals 340 are preferably performed by the decodability analysis module 412 and/or by the control and logic module 404.

The decodability analysis preferably includes at least one of a lighting analysis, an exposure (i.e. integration) analysis, a signal gain analysis, and a focus analysis using methods and algorithms that are known in the art. The lighting analysis analyzes lighting quality and the results are used to determine if the illumination provided by the illuminator 302 should be adjusted for the second set of imaging settings. The illumination control signal is generated in accordance with results of the lighting analysis, and transmitted, as described in the above paragraph, to the illumination control circuitry 322.

The signal gain analysis analyzes signal-to-noise ratio of the data received and the results are used to determine if gain circuitry of the signal processing circuitry 308 should be adjusted for the second set of imaging settings. The gain control signal is generated in accordance with results of the signal gain analysis, and transmitted, as described in the above paragraph, to the gain control circuitry 328.

The focus analysis determines focus quality of the data received and the results are used to determine if an adjustment is needed for the moving a lens of the lens assembly 304 for the second set of imaging settings. The lens adjustment control signal is generated in accordance with results of the focus analysis, and transmitted, as described in the above paragraph, to the focus control circuitry 324.

The exposure analysis analyzes the exposure used for the data received to determine if an adjustment is needed for the shutter 310 for the second set of imaging settings. The exposure control signal is generated in accordance with results of the exposure analysis, and transmitted, as described in the above paragraph, to the exposure control circuitry 330.

At determination step 610, a determination is made if the second stream of image data is received. If the second stream of data is not yet received, control returns to step 606, where a next section 512 (that was not yet processed) is processed. If the second stream of data is received, control goes to step 614. At step 614, a next section 512 (that was not yet processed) of the portion 506 of the first stream of data and/or a section 512 of portion 508 of the second stream of data are processed for determining if the data corresponding to the optical code resides in the section 512. Next sections 512 from a portion of the first and second streams 506, 508 are alternately processed each time step 614 is executed.

Alternatively, next sections 512 from the portion of the first and second streams 506, 508 are both processed (serially or in parallel, triple, etc.) each time step 614 is executed. As described above, preferably the portions of the first and second streams 506, 508 are complementary portions.

At determination step 618, a determination is made if image data corresponding to the optical code is found in either of the portions 506, 508. If data corresponding to the optical code is not yet found, control is returned to step 614. Once data corresponding to the optical code is found in one of the portions 506, 508, control goes to step 622.

At step 622, image data corresponding to the optical code are located in the other portion 506, 508 using the location of pixel data (pixel data addresses) where the optical code was found in step 618. At step 626, a decodability analysis is performed on the data corresponding to the optical code in the first and second portions 506, 508 and the results are compared to determine which of the first and second portions 506, 508 has corresponding data having a better decodability quality, e.g., better focus, better illumination, etc. It is contemplated that if the decodability quality for corresponding data from both portions 506, 508 is below an acceptable standard or threshold, the processor assembly 402 may send control signals to the imaging engine 14 for generating new imaging settings and request that the imaging engine 14 take a new set of images using the new imaging settings.

At step 630, image data corresponding to the optical code from the portion determined to have the better decodability quality are extracted using an extraction algorithm that is known in the art for determining the orientation of the optical code, determining the type of optical code (such as a one- or two-dimensional bar code), finding all of the data that corresponds to the optical code and retrieving the data that corresponds to the optical code. The extracted data are ready for decoding by the decoder module 414 which uses decoding methods known in the art.

Timing

In accordance with the present invention, reliability is improved for optical code imaging since two images are generated using different imaging configuration settings for the optical code reader, typically resulting in image data corresponding to the optical code of one of the two images having a better decodability quality. The two imaging configuration settings, as described above, may be predetermined or may be selected in accordance with sensed properties and/or processed values. The image having the better decodability quality is selected for decoding. The time consumed for determining and comparing the decodability quality and selecting the image to be processed for decoding is minimized by processing complementary portions of the two images.

In applications where a series of optical codes are read consecutively, it is important to limit the time consumed in generating and processing the two images for extracting the optical code from the image having the better decodability quality. When a time limit threshold is exceeded an unsuccessful read, such as misread, a no read or a no decode, may occur. In accordance with a preferred embodiment of the present invention, in addition to minimizing processing time, steps are taken to handle an occurrence of exceeding the time limit when reading a particular optical code without generating an unsuccessful read, where the steps take advantage of time saved during processing of other optical codes.

In an exemplary optical code reader system, the time limit threshold for processing an optical code is approximately 60–80 msec, where exceeding the time limit threshold will result in a lower user throughput which is undesirable. The time limit threshold is the time from initiating an optical code read, e.g., trigger activation, to completion of the imaging operation, e.g., when a beep sound is heard. Hence, the time limit threshold includes the time for locating and extracting the optical code, as well as the decoding time.

In the exemplary optical code reader system, the interval from the actuation of the imaging engine 14 for the first imaging to completion of exposing and transmitting the first set of image data to a processor for processing thereof is 33–66 msec. Likewise, the interval from the beginning of the second imaging, upon completion of the first imaging, to completion of transmission of the second set of image data to the processor is 33 msec. An insignificant time interval may exist between completion of transmitting the first set of image data and beginning the second imaging. Accordingly, the substantial interval from actuation to completion of transmission of second set of data is 66–99 msec, which exceeds the time limit threshold and which decreases the user throughput.

In accordance with the present operation, processing is begun immediately upon initial receipt of data of the first stream of data. By the time receipt of the second stream of data has begun, several sections 512 of the first portion 506 (see FIG. 5) have been processed, and perhaps the optical code has been located. When the second stream of data begins to arrive 33–66 msec later, if the optical code was located in the first set of data, then the optical code is easily located in the second set of data.

If the optical code has not been located, both the first and second portions 506 and 508 are searched for the optical code. However, data in the second portion 508 that corresponds to data that was already searched in the first portion 506 are not processed again for searching, thus conserving processing time. Accordingly, the time used to locate the optical code using the first and second images is not substantially longer than the time needed to locate the code in one image, and may ideally be close to 33 msec, and unlikely to approach the time limit threshold, thus increasing the likelihood of successfully reading the optical code within the time limit threshold. It is further possible, that if the optical code is found in the first data stream, before the second data stream begins to arrive, then the data code corresponding to the optical code will be extracted for decoding thereof.

Due to correspondence between data in the first and second images (i.e. corresponding to substantially the same field of view); once the optical code is located in one of the images it is located substantially immediately in the other image. Once a determination is made as to which of the data corresponding to the optical code in the first and second images has better decodability quality, the decoding process is able to proceed more quickly and reliably, as the data are more reliable than when only one image is used. Furthermore, in the embodiment in which the set of imaging configuration settings for the second imaging are controlled by the processor assembly 402, in accordance with processing results for the first image, the decodability quality of the second set of images is most likely to be relatively improved compared to the first set of data. This ensures better data reliability, thus allowing the decoding progress to proceed more quickly and reliably for achieving decoding within the time limit threshold.

In instances where the time limit threshold is exceeded, processing of the first and second data images may be terminated before completion and imaging/processing of a next optical code begun. In one embodiment, an indication, such as a displayed message, an audible tone or an LED illumination, may be provided to the user to indicate that an unsuccessful read occurred. It is contemplated that instead of or in addition to an unsuccessful read indication, the first and second data images which were not fully processed may be temporarily stored for future processing. Information regarding the processing that has already been performed (i.e., incomplete processing) on the first and second data images may also be stored. Processing of the temporarily stored data images may be completed at another opportunity, preferably starting from where the incomplete processing left off. Opportunities for completing incomplete processing of optical codes exist after processing a series of optical codes and/or during extra time which remains when one or more optical codes are read within the time limit threshold.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

The invention claimed is:

1. A method for imaging an optical code comprising the steps of:
    consecutively imaging an optical code using at least a first and a second imaging setting, respectively;
    generating at least first and second sets of pixel image data corresponding, respectively, to the consecutive imaging using the first and second imaging settings;
    evaluating at least one of the first and second sets of pixel image data after the consecutive imaging and prior to performing a decode attempt on the first and second sets of pixel image data;
    selecting at least one of the first and second sets of pixel image data in accordance with the evaluation; and
    decoding pixel image data from the selected set of pixel image data that corresponds to the optical code.

2. The method according to claim 1, wherein the step of consecutively imaging includes the step of imaging using the second imaging setting immediately after imaging using the first imaging setting.

3. The method according to claim 1, further comprising the steps of:
   evaluating a decodability quality of the first set of pixel image data; and
   configuring the second imaging setting according to the evaluation results.

4. The method according to claim 1, wherein the first and second imaging settings each include at least one of a focus point setting, an illumination level setting, a signal gain setting, and an exposure setting.

5. The method according to claim 1, wherein the evaluating step includes evaluating a decodability quality of at least one of the first and second sets of pixel image data.

6. The method according to claim 1, wherein the evaluation step includes evaluating a portion of the first set of pixel image data and a portion of the second set of pixel image data that is complementary to the portion of the first set of pixel image data.

7. The method according to claim 1, wherein the first imaging setting includes a first focal point setting, and the second imaging setting includes a second focal point setting, wherein the first and second focal point settings are different.

8. The method according to claim 1, wherein the selecting step includes the steps of:
   comparing evaluation results corresponding to the first and second sets of pixel image data; and
   selecting at least one of the first and second sets of pixel image data in accordance with the comparison.

9. The method according to claim 1, wherein:
   the evaluating step includes evaluating only one set of pixel image data and determining if results of the evaluation satisfy a predetermined condition;
   the selecting step includes selecting the evaluated set of pixel image data if the results of the evaluation satisfy the predetermined condition, and further comprising the steps of:
   evaluating the other set of pixel image data if the results of the evaluation do not satisfy the predetermined condition and comparing the evaluation results corresponding to the first and second sets of pixel image data; and
   selecting at least one of the first and second sets of pixel image data in accordance with the comparison.

10. The method according to claim 1, wherein the evaluating step includes the steps of:
    locating pixel image data in at least one of the respective first and second sets of pixel image data that corresponds to at least a portion of the optical code; and
    evaluating the respective located data.

11. The method according to claim 1, wherein a location of an optical code in the pixel image data in one of the first and second sets of pixel image data is used to locate pixel image data that corresponds to at least a portion of the optical code in the other set of pixel image data.

12. The method according to claim 1, further comprising the step of receiving at least one of the first and second sets of pixel image data while performing the evaluating step.

13. A system for imaging an optical code comprising:
    means for consecutively imaging an optical code using at least a first and a second imaging setting, respectively;
    means for generating at least first and second sets of pixel image data respectively corresponding, respectively, to the consecutive imaging using the first and second imaging settings;
    means for evaluating at least one of the first and second sets of pixel image data after the consecutive imaging and prior to performing a decode attempt on the first and second sets of pixel image data;
    means for selecting at least one of the first and second sets of pixel image data in accordance with the evaluation; and
    means for decoding pixel image data included in the selected set of pixel image data that corresponds to the optical code.

14. The system according to claim 13, wherein the means for consecutively imaging includes means for imaging using the second imaging setting immediately after imaging using the first imaging setting.

15. The system according to claim 13, further comprising:
    means for evaluating a decodability quality of the first set of pixel image data; and
    means for configuring the second imaging setting according to the evaluation results.

16. The system according to claim 13, wherein the first and second imaging settings each include at least one of a focus point setting, an illumination level setting, a signal gain setting, and an exposure setting.

17. The system according to claim 13, wherein the means for evaluating includes means for evaluating a decodability quality of at least one of the first and second sets of pixel image data.

18. The system according to claim 13, wherein the means for evaluation includes means for evaluating a portion of the first set of pixel image data and a portion of the second set of pixel image data that is complementary to the portion of the first set of pixel image data.

19. The system according to claim 13, wherein the first imaging setting includes a first focal point setting, and the second imaging setting includes a second focal point setting, wherein the first and second focal point settings are different.

20. The system according to claim 13, wherein the means for selecting includes:
    means for comparing evaluation results corresponding to the first and second sets of pixel image data; and
    means for selecting at least one of the first and second sets of pixel image data in accordance with the comparison.

21. The system according to claim 13, wherein the means for evaluating and the means for selecting collectively comprise at least one processor for performing the steps of:
    evaluating only one set of pixel image data and determining if results of the evaluation satisfy a predetermined condition;
    selecting the evaluated set of pixel image data if the results of the evaluation satisfy the redetermined condition;
    evaluating the other set of pixel image data if the results of the evaluation do not satisfy the predetermined condition and comparing the evaluation results corresponding to the first and second sets of pixel image data; and
    selecting one of the first and second sets of pixel image data in accordance with the comparison.

22. The system according to claim 13, wherein the means for evaluating includes:
    means for locating pixel image data in at least one of the respective first and second sets of pixel image data that corresponds to at least a portion of the optical code; and
    means for evaluating the respective located data.

23. The system according to claim 13, wherein a location of an optical code in the pixel image data in one of the first and second sets of pixel image data is used to locate pixel image data that corresponds to at least a portion of the optical code in the other set of pixel image data.

24. The system according to claim 13, wherein the means for evaluating receives at least one of the first and second sets of pixel image data is being received while the means for evaluating evaluates.

25. An optical code reading system comprising:
an imaging engine having a lens assembly and a photo sensor array for consecutively imaging an optical code located in a field of view of the imaging engine using at least a first and a second imaging setting, respectively, and generating at least first and second sets of pixel image data corresponding, respectively, to the consecutive imaging using the first and second imaging settings;
processing means for evaluating at least one of the first and second sets of pixel image data after the consecutive imaging, and selecting at least one of the first and second sets of pixel image data in accordance with the evaluation prior to performing a decode attempt on the first and second sets of pixel image data; and
processing means for decoding pixel image data from the selected set of pixel image data that corresponds to the optical code.

26. The optical code reading system according to claim 25, wherein the processing means further configures the second imaging setting in accordance with evaluation of the first set of pixel image data.

27. The optical code reading system according to claim 26, wherein the imaging engine further includes at least one of an illuminator assembly, a shutter assembly, signal processing circuitry, an illuminator control assembly for controlling the illuminator assembly, an exposure control assembly for controlling the shutter assembly, signal processing control circuitry for controlling the signal processing circuitry, and a focus control assembly for controlling the lens assembly; and
wherein the processing means generates control signals in accordance with the second image setting for controlling at least one of the illuminator control assembly, the exposure control assembly, the signal processing control circuitry, and the focus control assembly.

28. The optical code reading system according to claim 25, wherein the processing means evaluates a portion of the first set of pixel image data and a portion of the second set of pixel image data that is complementary to the portion of the first set of pixel image data.

29. A method for imaging an optical code comprising the steps of:
consecutively imaging said optical code using at least a first and a second imaging setting, respectively;
generating at least first and second sets of pixel image data corresponding, respectively, to the consecutive imaging using the first and second imaging settings; and
transmitting the first and second sets of pixel image data to an external processor for processing of the pixel image data, wherein the external processor processes the first and second sets of pixel image data in accordance with a processing method comprising the steps of:
evaluating at least one of the first and second sets of pixel image data after the consecutive imaging and prior to performing a decode attempt on the first and second sets of pixel image data;
selecting at least one of the first and second sets of pixel image data in accordance with the evaluation; and
decoding pixel image data from the selected set of pixel image data that corresponds to the optical code.

30. A computer readable medium storing programmable instructions capable of being executed by a processor for performing the steps of:
receiving at least first and second sets of pixel image data corresponding, respectively, to consecutive imaging of an optical code using respective at least first and second image settings;
evaluating at least one of the first and second sets of pixel image data after the consecutive imaging and prior to performing a decode attempt on the first and second sets of pixel image data;
selecting at least one of the first and second sets of pixel image data in accordance with the evaluation; and
decoding pixel image data from the selected set of pixel image data that corresponds to the optical code.

31. A computer data signal embodied in a transmission medium for execution by at least one processor for processing an imaged optical code, the data signal comprising:
a code segment including instructions for receiving at least first and second sets of pixel image data corresponding, respectively, to consecutive imaging of an optical code using respective at least first and second image settings;
a code segment including instructions for evaluating at least one of the first and second sets of pixel image data after the consecutive imaging and prior to performing a decode attempt on the first and second sets of pixel image data;
a code segment including instructions for selecting at least one of the first and second sets of pixel image data in accordance with the evaluation; and
a code segment including instructions for decoding pixel image data from the selected set of pixel image data that corresponds to the optical code.

* * * * *